United States Patent [19]

Pauly

[11] 3,993,528

[45] Nov. 23, 1976

[54] METHOD OF CONSTRUCTING SOLAR FURNACE

[76] Inventor: Lou A. Pauly, 3598 Crocker Road, Eugene, Oreg. 97407

[22] Filed: June 25, 1975

[21] Appl. No.: 590,129

Related U.S. Application Data

[62] Division of Ser. No. 458,599, April 8, 1974, abandoned.

[52] U.S. Cl. ................................. 156/245; 29/600; 126/270; 343/912; 350/288
[51] Int. Cl.² ...................... B29G 7/02; F24J 3/02
[58] Field of Search ........... 156/245; 350/288, 292, 350/293, 320; 126/270, 271; 343/832, 833, 836, 837, 839, 873, 912; 29/600

[56] References Cited
UNITED STATES PATENTS

| | | | |
|---|---|---|---|
| 797,891 | 8/1905 | Himalaya | 126/270 |
| 2,760,920 | 8/1956 | Olsen | 126/270 |
| 3,030,259 | 4/1962 | Long | 156/245 |
| 3,119,109 | 1/1964 | Miller et al. | 343/912 |
| 3,536,800 | 10/1970 | Hubbard | 343/912 |

*Primary Examiner*—Caleb Weston
*Attorney, Agent, or Firm*—James D. Givnan, Jr.

[57] ABSTRACT

A solar furnace of dish-shaped configuration for the reflection of solar rays toward a heat exchanger through which passes a heated medium. The reflective surface of the furnace comprises a multitude of mirror elements incorporated into a fiber glass reinforced plastic structure with each of the mirror elements located so as to reflect rays toward a common focus. A wire grid spaces each of the mirror elements during furnace construction. Each of said mirror elements is temporarily supported on a loosely woven fiber glass cloth permitting each element to individually adapt to the curvature of a convex mold. Subsequent application of fiber glass and resin to the thickness desired results in a rigid dish-shaped structure within which may incorporate support components. A method of furnace construction is additionally set forth.

4 Claims, 9 Drawing Figures

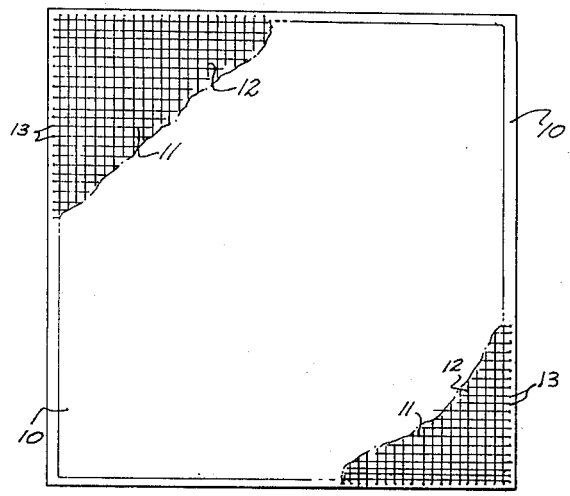
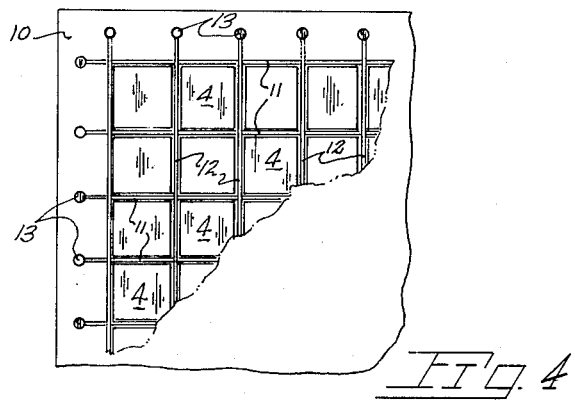
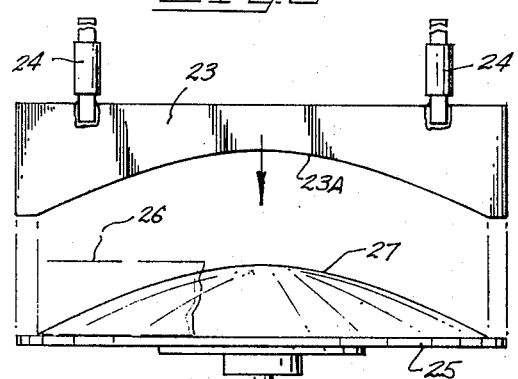
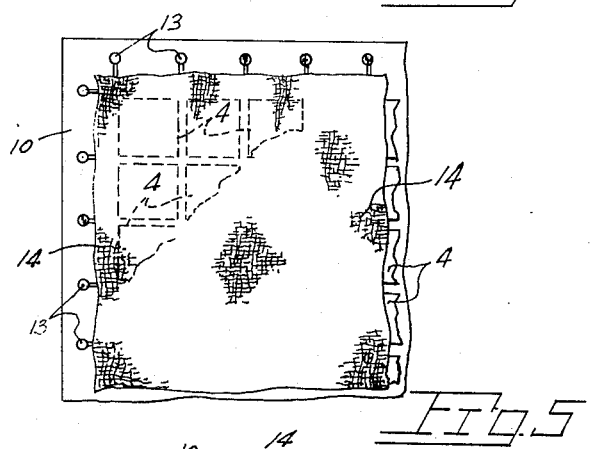
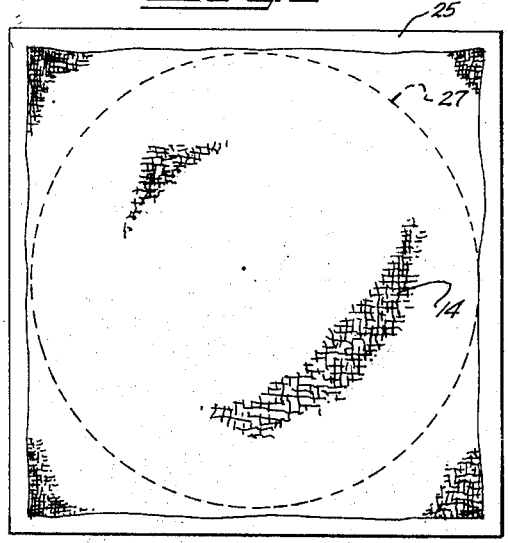
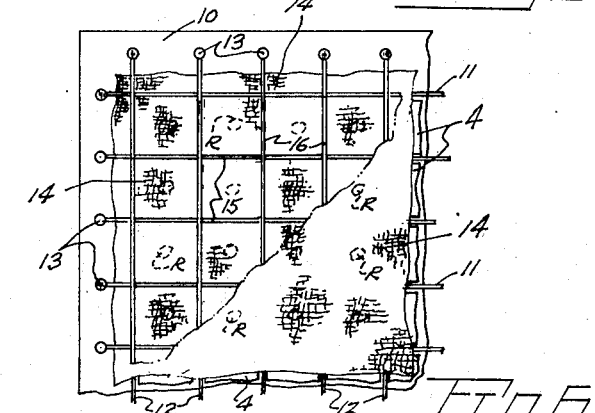
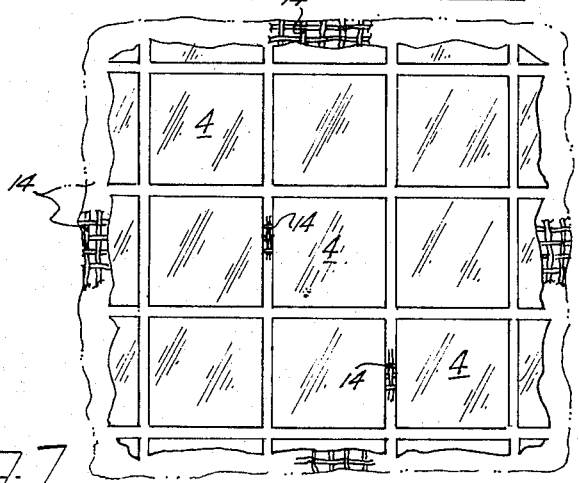

METHOD OF CONSTRUCTING SOLAR FURNACE

This is a division of application Ser. No. 458,599, filed Apr. 8, 1974, now abandoned.

BACKGROUND AND SUMMARY OF THE INVENTION

The present invention concerns a reflective solar furnace for utilization of solar rays and a method for constructing said furnace.

Utilization of solar energy while highly desirable for obvious reasons encounters numerous obstacles one of which being the fabrication of a furnace and optical components at a reasonable cost. For this and other reasons use of solar energy has been limited, for the most part, to experimental uses under laboratory conditions.

In the construction of dish-shaped solar furnaces the reflective surface or surfaces must be in a precise angular relationship for reflection of the light rays toward a common target or focus whereat a heat exchanging device is located. Fabrication of the reflective solar furnace from a monolithic mass with known methods would incur extensive manhour effort resulting in a furnace too costly for all but experimental purposes.

The shell portion of the present solar furnace is fabricated from relatively low cost materials utilizing known fiber glass lay-up techniques well within the capability of a skilled workman. The combination of reflective material with said shell does not require the time consuming care or optical skill normally associated with optical devices resulting in a substantial cost reduction. The present method utilizes a template to uniformly shape a convex mold on which the solar furnace is formed. The mirror elements are initially applied to a loosely woven sheet of material for subsequent simultaneous application to the mold whereby each element is properly positioned with respect to the molds axis so as to provide a common focal point at a point along said axis. The dished-shaped furnace is completed over the convex mold member with known fiber glass techniques. The heat exchanger is suitably served by conduits which may be routed through the furnace shell.

Important objects of the present solar furnace and method of constructing same include: the provision of a furnace having a multitude of mirror elements each disposed about a concave surface so as to provide a common focal point for the reflected rays; the provision of a furnace of lightweight durable construction for exposure to the elements; the provision of a furnace utilizing readily available relatively low cost components enabling the furnace adaptable to a wide range of applications; a method of furnace construction within the capability of skilled workers not requiring a high degree of optical experience nor the precision effort normally encountered in the fabrication of optical instruments; the provision of a low cost method of furnace construction whereby mirror elements may be applied about the convex mold surface in a convenient manner dispensing with individual placement of said mirror elements to substantially reduce manufacturing costs.

BRIEF DESCRIPTION OF THE DRAWINGS

In the accompanying drawings:

FIG. 3 is a plan view of a working surface on which is formed a superimposed wire grid, FIG. 4 is an enlarged fragmentary view of one corner of the work surface and grid shown in FIG. 3 with mirror elements in place within the grid wires, FIG. 5 is a view similar to FIG. 4 but with a layer of fiber glass fabric superimposed on the mirror elements, FIG. 6 is a view similar to FIG. 5 with secondary grid wires applied over the fiber glass material, FIG. 7 is a full scale plan view of the mirror element side of the mirror element - fiber glass combination, FIG. 8 is a side elevational view of a template and rotary table used in mold fabrication, and FIG. 9 is a plan view of a mirror-bearing fiber glass sheet in place over the convex mold.

DETAILED DESCRIPTION OF THE PREFERRED EMBODIMENT

Figure 1:
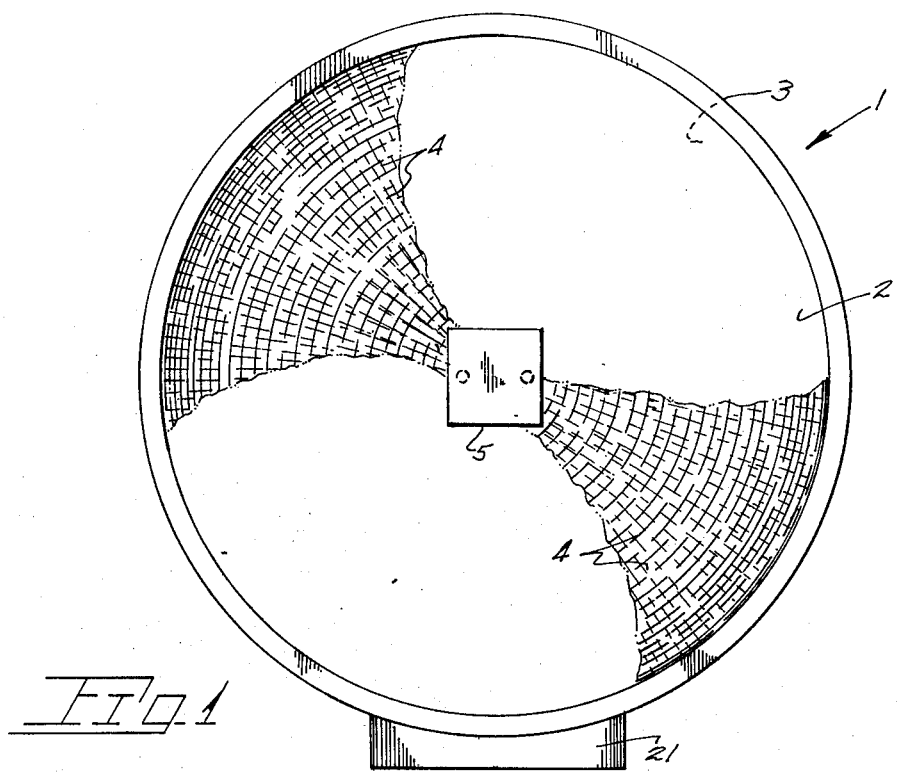
FIG. 1 is a front elevational view of a solar furnace made in accordance with the present invention.

With continuing attention to the accompanying drawings wherein applied reference numerals indicate parts similarly identified in the following description, the reference numeral 1 indicates generally a solar furnace of dish shape having concave-convex sides indicated at 2 and 3. Concave surface 2 comprises a multitude of mirror elements 4 each disposed having a reflective angle to redirect solar rays toward a focus whereat a heat exchanger 5, served by conduit 5A–5B, is located. The present method of constructing the furnace is set forth in the following description and comprises a part of the instant invention. With attention again to furnace construction, the mirror elements 4 constituting the concave surface of the furnace are in closely spaced disposition with each of said elements having its sides spaced or offset from the adjacent side of adjoining mirror elements. Further construction details of the present furnace are best understood from an understanding of the following method of furnace construction. The mirror elements 4, best seen in FIG. 4, are shown as being of straight sided, planar configuration.

With attention to FIG. 3 a work surface 10 is provided with a grid of crossing wires 11 and 12 each suitably secured at their ends to pegs 13 provided in rows along each marginal area of the work surface. The grid so formed has rectangular interstices for the reception of mirror elements of which are deposited reflective (uncoated) side down on work surface 10. Accordingly mirror elements 4 are spaced from one another by wires approximately one-sixteenth of an inch in diameter with the uppermost (coated) surfaces of each mirror element lying in a horizontal plane above the grid wires 11 and 12.

With attention now to FIG. 5, a woven fiber glass sheet or cloth 14 is superimposed on the uppermost coplanar mirror element surfaces. The sheet overlies and substantially covers the work surface 10 and the mirrors thereon. The woven fiber glass sheet 14 is of a loosely woven nature with the warp and woof strands being of mesh appearance. Such sheeting is of the type commonly used in contact molding operations and is used primarily in the construction of large simple forms.

A secondary grid, shown in FIG. 6, is formed by intersecting wires 15 and 16 removably attached at their ends to grid posts 13 such wires forming a grid identical and upwardly spaced from the first described grid. With continuing attention to FIG. 6, a suitable resin R in a very small quantity is applied to the center of the area defined by the secondary grid wires 15 and 16 which serves as an adhesive to attach each mirror element to fiber glass sheet 14. The wires 15 and 16 are removed from their pegs 13 to permit removal of cloth 14 upon the resin curing.

Upon the resin curing a secure bond results between the uppermost (coated) side of each mirror and the fiber glass cloth with the loosely woven strands of the cloth permitting relative movement or shifting between the mirror element and the sheet as the attachment is made to but a few of the fiber glass yarns lying in place over the mirror element. Movement of the mirror element is of importance when the combined cloth 14 and mirror elements 4 are lifted from work surface 10 and applied to the mold. One suitable resin are those polyester resins of a thermosetting nature commonly used in the lay-up of fiber glass structures.

Additional layers of fiber glass material are applied to the first mentioned fiber glass cloth along with quantities of resin using procedures well known in the fiber glass reinforced plastic art. For appearance sake a gel coat is applied to the convex side 3 of the dish-shaped structure as well as to the rim portion. The lay-up of fiber glass with resin is continued until a dish like structure is completed having suitably mechanical porperties to withstand the loads encountered by an exposed solar furnace.

Figure 2:
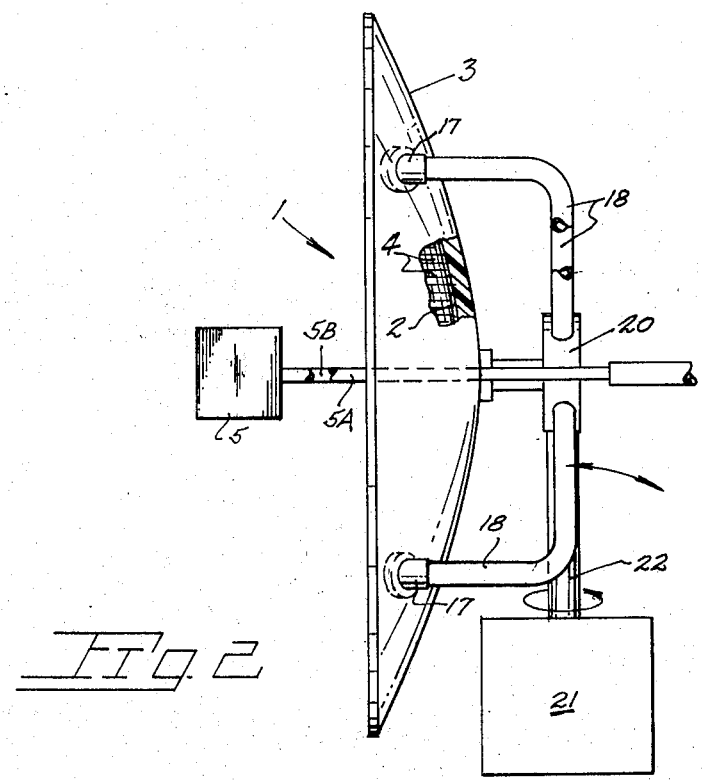
FIG. 2 is a side elevational view of the furnace shown in FIG. 1.

During the lay-up operation attachment means at 17, shown as flanged sockets in FIG. 2, are incorporated intermediate layers of fiber glass material. A typical support structure of the furnace may include lightweight tubular members 18 in supporting engagement with said sockets and with a base 20. Said base in turn is movably supported by conventional tracking means indicated at 21 having a support post 22 capable of imparting tracking movement to said base about two intersecting axes. Accordingly furnace 1 may move in the direction of the applied arrows in FIG. 2 in response to operation of said tracking means to at all times locate the axis of the furnace parallel to solar rays. The tracking means forms no part of the present invention and accordingly a further explanation is believed unnecessary.

The mold for the present solar furnace may be constructed by use of a rigid template indicated at 23 in FIG. 8. Guides at 24 assure template movement along a vertical plane common to the rotational axis of a powered turntable 25. The template has a working edge 23A contactable with a quantity of workable plastic material at 26 such as clay with the template edge being gradually urged into contact with the rotating material to form the convex mold at 27. The curvature of said surface will be determined by the size and focal point distance of the furnace under construction, the formula for calculating such being known to those skilled in the art. A motor at M with an internal induction drive powers turntable 25 at a low R.P.M. Turntable 25 is subsequently removed with mold 27 in place thereon for subsequent application of a release agent whereafter the combined fiber glass sheet 14 with mirror elements 4 are superimposed. The subsequent construction of the shell is as earlier described.

Upon completion of the lay-up of successive applications of fiber glass cloth and resin to the desired thickness, the circular perimeter of the dish-shaped structure is formed by trimming of the fiber glass body on an appropriate rotary jig. As earlier mentioned, sockets at 17 of the support structure may be incorporated into the glass reinforced plastic disc during the lay-up process.

The dish-shaped furnace so constructed is well able to withstand exposure to the elements. The type, size and shape of the heat exchanger used with the present furnace will be dependent upon the particular use to which the furnace is applied. In one embodiment of the invention the furnace utilizes mirror elements three quarters of an inch square and a mold having a diameter of 48 inches. The energy imparted to heat exchanger 5 for heating of the medium passing therethrough is adequate to heat water for household uses which may include a space heating system.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. The method of constructing a dish-shaped solar furnace for reflecting solar rays toward a heat exchanger, the method comprising the following steps, placement of a multitude of mirror elements in rows on a horizontal supporting surface in a mutually spaced apart manner with their coated surfaces uppermost, superimposing a fiber glass cloth over the uppermost surfaces of the mirror elements, depositing a discrete quantity of an adhesive agent on the fiber glass cloth above each of said mirror elements therebelow to form a bond between those areas of the cloth receiving a discrete quantity of adhesive agent and the uppermost surface of a subjacent mirror element, removal of the fiber glass cloth and attached mirror elements from the horizontal supporting surface, shaping of the cloth and subjacently attached mirror elements about a convex mold surface having a shape corresponding to the desired curvature of the dish-shaped solar furnace with the spaced apart mirror elements independently adjusting into tangential supported contact with the mold surface, and subsequently applying additional resin and reinforcing fiber glass material to the outer surface of the cloth until a desired thickness is achieved to provide the rigidity desired.

2. The method claimed in claim 1 including a preliminary step of forming a wire grid above said supporting surface, the grid defining interstices for individual placement of each mirror element.

3. The method claimed in claim 2 including the additional step subsequent to superimposing of the fiber glass cloth of forming a second wire grid corresponding to the first grid and to the spacing between mirror elements underlying the cloth to indicate the location of said mirror elements to facilitate depositing a discrete adhesive quantity on the cloth above each concealed mirror element.

4. The method claimed in claim 3 wherein the adhesive agent joins only a portion of the uppermost coated surface of each mirror element with a like area of the superimposed fiber glass cloth to permit relative movement between the mirror element and the cloth during application of the cloth and attached mirror elements to the convex mold surface.

* * * * *